Patented May 18, 1943

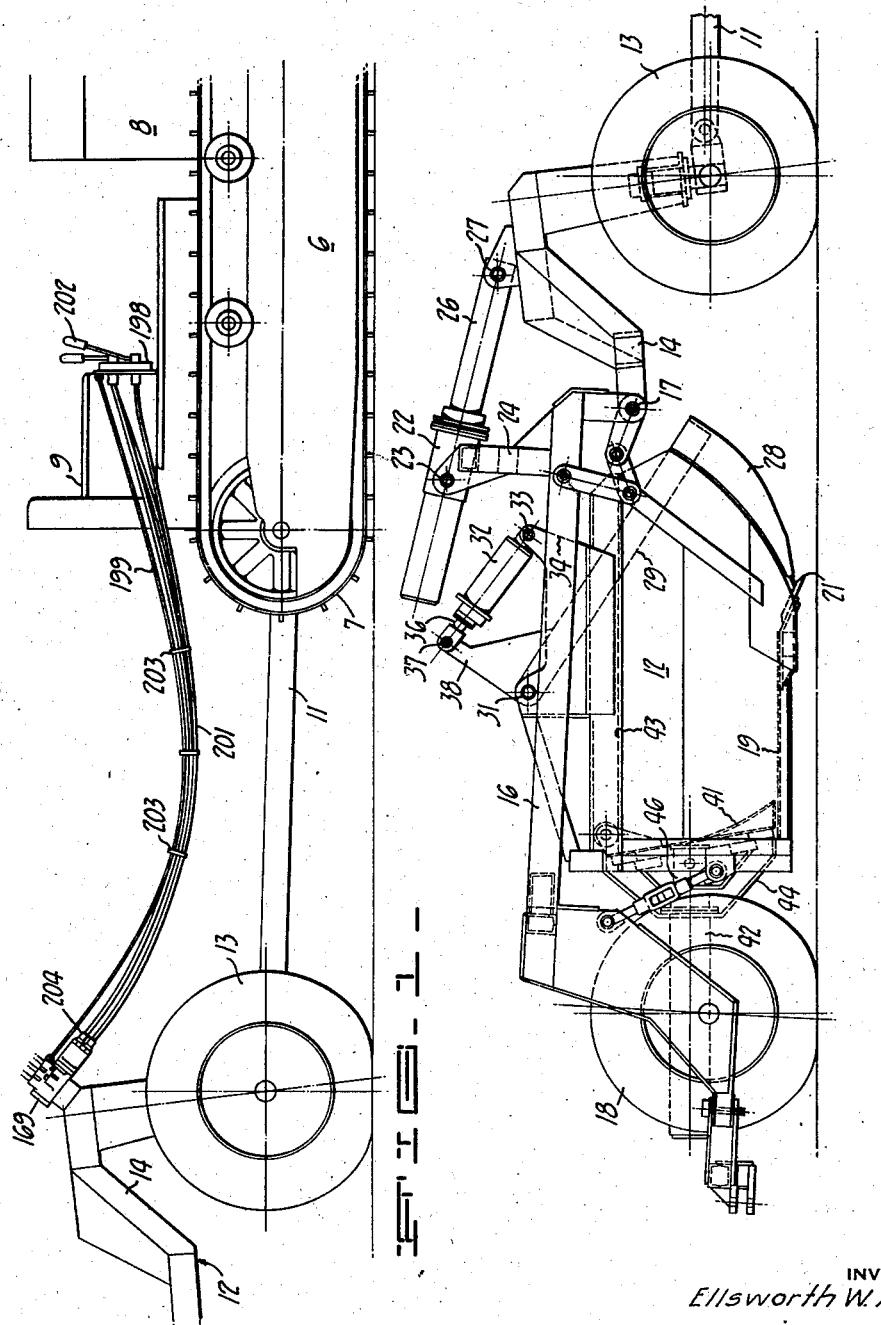

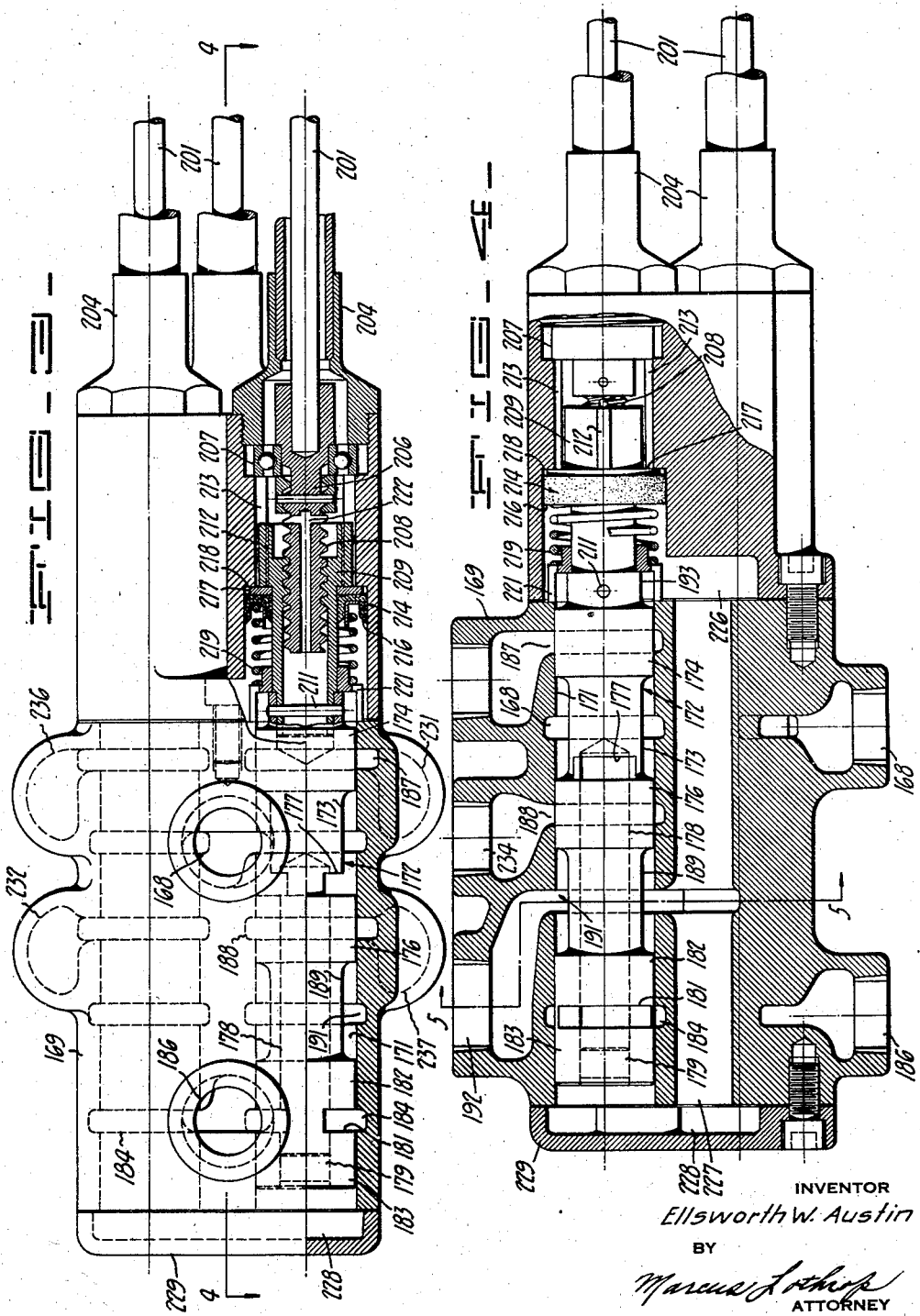

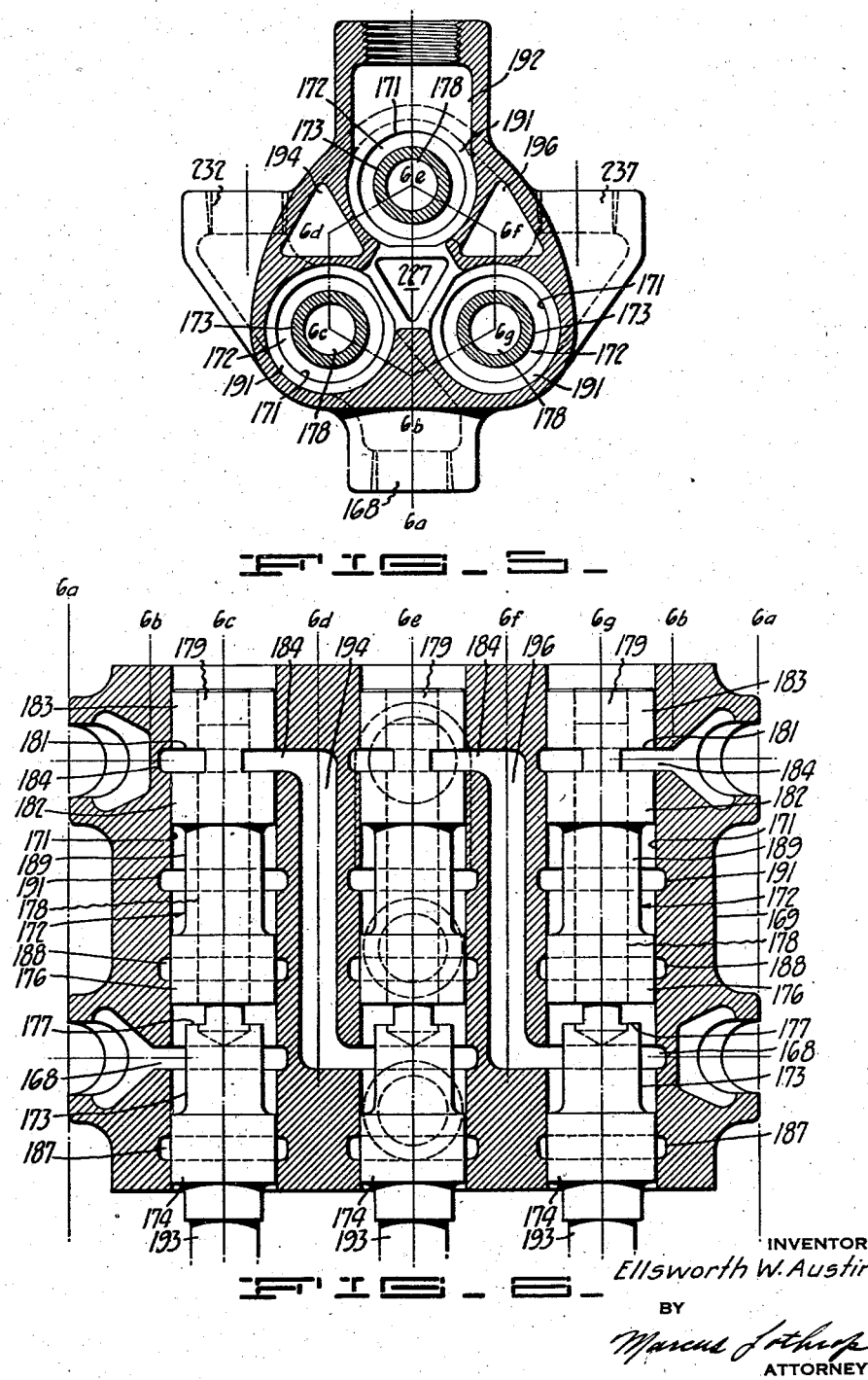

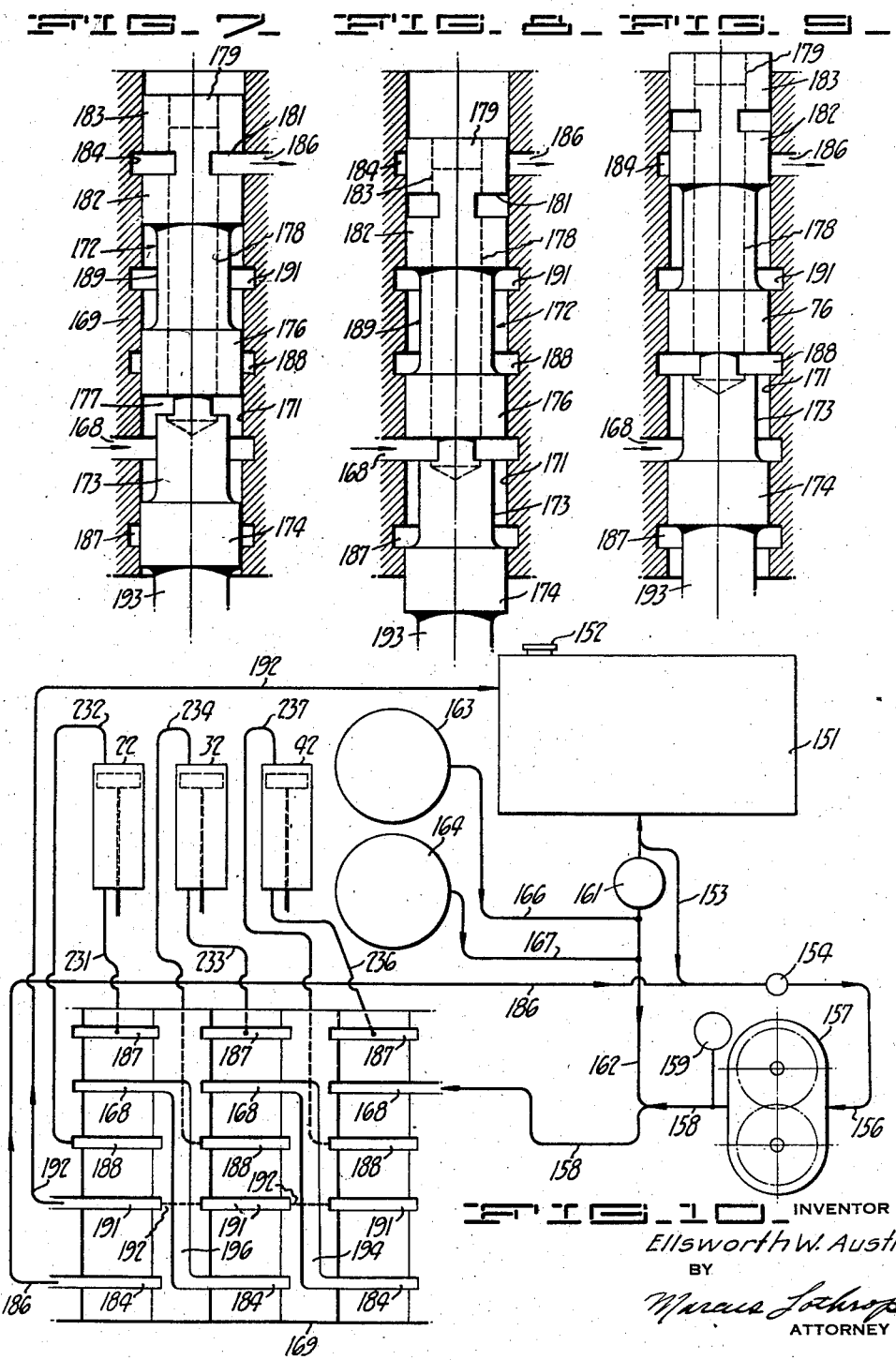

2,319,486

UNITED STATES PATENT OFFICE 2,319,486

EARTH MOVER

Ellsworth W. Austin, Cedar Rapids, Iowa, assignor to La Plant-Choate Mfg. Co., Inc., Cedar Rapids, Iowa, a corporation of Delaware Original application November 1, 1937, Serial No. 172,094. Divided and this application October 10, 1941, Serial No. 414,475

6 Claims. (Cl. 37—126)

My invention relates to means intended to be utilized in gathering, conveying and discharging material such as earth, when propelled by a tractor or other suitable draft implement. Devices of this general character are disclosed in my Patents 2,203,713 and 2,204,033, which issued on June 11, 1940. This application is also a division of my application entitled "Earth mover" filed November 1, 1937, under Serial No. 172,094, now Patent No. 2,273,010. The present subject matter is especially concerned with means operable on a draft vehicle such as a tractor for controlling various operating instrumentalities on the drawn vehicle which is the carrier scraper.

It is in general an object of my invention to provide an improved earth mover.

Another object of my invention is to provide a remote control means for an earth mover.

An additional object of my invention is to provide means for controlling a plurality of hydraulic actuating devices from a remote point.

An additional object of my invention is to provide an accurate remote controller.

A further object of my invention is to provide a controlling instrumentality which is well adapted for use in any articulated vehicle.

The foregoing and other objects are attained in the embodiments of the invention illustrated in the drawings, in which—

Fig. 1 is a side elevation showing portions of the draft vehicle and of the drawn vehicle, and especially showing the arrangement of the remotely operated hydraulic valve control.

Fig. 2 is a side elevation of an earth mover constructed in accordance with my invention, especially disclosing the hydraulic mechanism, but some of the hydraulic connections and other portions being omitted to increase the clarity of the disclosure.

Fig. 3 is a bottom plan view of a hydraulic valve arrangement, a portion being broken away to show the valve actuator in cross-section.

Fig. 4 is a cross-section the plane of which is indicated by the line 4—4 of Fig. 3.

Fig. 5 is a cross-section the planes of which are indicated by the lines 5—5 of Fig. 4.

Fig. 6 is a developed cross-section the planes which are indicated by the lines 6a—b—c—d—e—f—g—h—a of Figs. 5 and 6.

Fig. 7 is a diagrammatic cross-section of a hydraulic valve in an intermediate position.

Fig. 8 is a diagrammatic cross-section of a hydraulic valve in one extreme position.

Fig. 9 is a diagrammatic cross-section of a hydraulic valve in another extreme position.

Fig. 10 is a schematic piping diagram of the hydraulic circuits used in my earth mover.

In its preferred form, the earth mover of my invention includes a draft vehicle and a drawn vehicle which are articulated for relative movement. On the drawn vehicle is provided a plurality of hydraulic instrumentalities and control valves. These are arranged to be operated by controllers on the draft vehicle through intermediate connections and are supplied with hydraulic fluid under pressure from the draft vehicle.

While the earth mover of my invention can be embodied in a number of different ways, it is illustrated herein as it has taken a successful form which includes a draft vehicle, generally designated 6, such as a tractor, preferably one of a type having track laying tracks 7. On the tractor is a suitable source of power such as an engine (not shown) contained within the tractor hood 8 and controlled by an operator who normally occupies an operating station 9 on the draft vehicle. This machine is connected in any suitable way, for example by a draw-bar 11 constituting a suitable articulation, to a drawn vehicle, generally designated 12, which includes a front steering wheel truck 13 connected to a front frame portion 14. The rear frame portion 16 is pivoted by a pin 17 to the front frame portion and is also supported from the ground by rear ground-engaging wheels 18. Supported by the frame portions 14 and 16 is an earth carrying bowl 19 having an excavating edge or cutting edge 21 in the customary fashion. In order to raise and lower the cutting edge 21, the frame portions 14 and 16 are moved by an expansible chamber mechanism including a cylinder 22 connected by pivots 23 to a central bracket 24 upstanding from the frame portion 16 and within which operates a plunger 26 connected by a pivot 27 to the forward frame portion 14. The chamber 22 constitutes one of the hydraulic mechanisms which is controlled.

The main bowl 12 is closed or opened by means of a front apron 28 mounted on pivot arms 29 disposed at opposite sides of the machine and journalled on pivot pins 31. To raise and lower the front apron a pair of expansible chamber mechanisms 32 are at one end connected by pins 33 to a bracket 34 upstanding from the side wall of the main bowl 12. Within the chamber or cylinder 32 is disposed a piston having a piston rod 36 connected by a pivot 37 to a bell crank arm 38 merging with the arm 29. The expansible chambers 32 are connected, preferably in parallel, and are another instrumentality controlled hydraulically by the operator on the draft vehicle 6.

To eject material from the main bowl 12 a rear pusher wall 41 is provided and is designed to be advanced on tracks 43 at either side of the main bowl. An expansible chamber mechanism 42 extending centrally and rearwardly from the pusher but mounted on extensions 44 of the main frame is provided. The chamber 42 contains a plunger 46 freely slidable therein and connected to the pusher 41 so that the chamber is another of the hydraulically expansible mechanisms which is under the control of an operator in the station 9.

The hydraulic system for effecting the movement of the various instrumentalities of the earth mover under control of the operator is preferably worked with an hydraulic fluid such as oil, a supply of which is contained in a reservoir or tank 151 suitably located for replenishment from time to time through an atmospheric vent and filler cap 152. A conduit 153 leads from the tank through a check valve 154 to the inlet 156 of a positive pressure pump 157, preferably a meshing gear pump suitably driven by the engine of the tractor 6. As the pump rotates, it withdraws hydraulic fluid through the conduit 153 and expels it at an elevated pressure into a conduit 158. The amount of pressure is indicated by a gauge 159 appropriately located for easy perusal by the operator at the station 9. A set or definite pressure is maintained in the discharge conduit 158 by the provision of a relief valve 161 in a bypass conduit 162 which leads from the discharge conduit 158 back to the tank 151. The relief valve 161 can be set at any selected pressure, for example a pressure in the neighborhood of 1,000 lbs. per square inch, so that, despite variations in speed of operation of the pump 157, or variations in demand upon the hydraulic system, the effective working pressure is kept approximately at the set value.

In order to provide a reserve or cushion to prevent undue fluctuations in pressure incident to relatively heavy demand by operation of the hydraulic mechanism, and in order, further, to permit the utilization of a pump of relatively small capacity, I preferably provide a means for storing, under relatively high pressure, a quantity of working fluid, and for that reason connect to the bypass conduit 162 one or more reservoirs 163 and 164. These are tanks able to withstand high pressure and are connected by conduits 166 and 167, respectively, to the by-pass pipe 162. When the pressure in the system in general is below the maximum set by the valve 161, the pump discharges either into the actuating cylinders or into the storage tanks 163 and 164. These tanks 163 and 164 are not at any time entirely filled with hydraulic fluid, but are so located that an air cushion exists in the upper portion thereof which acts as a cushion or spring to maintain the requisite pressure upon the working fluid. When the pressure in the system arrives at the set maximum amount, further discharge by the pump 157 is returned to the tank 151, while when a relatively heavy demand for operating fluid comes upon the system, the tanks 163 and 164 are partially discharged to augment the discharge capacity of the pump 157.

From the discharge conduit 158 the pressure working fluid is led to a series of valves which are utilized for the control of the hydraulic cylinders, and in order to simplify the disclosure the valves are illustrated diagrammatically in Figs. 7 to 10 inclusive. Each of the actuating cylinders, such as the chamber 42, has its own controlling valve, and since all of the valves are identical they are described primarily in connection with Figs. 7, 8 and 9 wherein their fundamental characteristics are diagrammatically illustrated. For example, the pressure conduit 158 leads to an inlet port or groove 168 in a valve body 169. Adapted to move axially or to reciprocate within the body 169 is a valve bobbin 172 of generally cylindrical configuration and having a contour to afford communication between different parts of the hydraulic system for different positions of the valve.

For example, the valve in Fig. 7 is in such a position that pressure fluid from the port 168 flows around the reduced portion 173 of the valve bobbin but is restrained from further flow within the bore by lands 174 and 176. The fluid flows radially through passages 177 into a central bore 178 piercing the valve bobbin and extending for a portion of its length, being closed off at its end by a plug 179. Pressure fluid flowing through the passage 178 leaves through radial openings 181 between lands 182 and 183. The fluid then flows into an annular port or groove 184 in the body 169, from which it leaves through a conduit 186, to re-enter the inlet conduit 153 for recirculation by the pump 157. There is thus maintained a continual flow of fluid through the valve bobbin 176 when it is in the neutral position shown in Fig. 7. Since all of the bobbins are identical there is a free circulation of working fluid through all of them in series, as shown in Fig. 10, in a closed circuit including the pressure pump 157. This is beneficial in keeping the system free of air or developed gas and insures that hydraulic fluid is instantly available in all of the hydraulic conduits.

When the valve bobbin 172 is axially translated into an actuating position, as shown in Fig. 8 for example, the pressure fluid which normally enters near the port 168 and which previously has been flowing through the internal passage 178 is precluded longer from flowing therethrough since the opening 181 is no longer in registry with the port 184 but rather is in registry with the inner cylindrical wall 171 of the body 169. With the displacement of the valve bobbin, the land 174 has been moved to uncover an annular port 187 in the body 169, which receives the entire inflow from the conduit 168 and directs it into one end of the hydraulic chamber controlled by the valve.

The addition of fluid to one end of the chamber displaces the double-acting piston therein, so that fluid from the other end of the chamber on the other side of the piston is displaced and flows back to the body 169 through a port 188 which is annular in configuration and which is uncovered by the land 176 in the displaced position of the valve. The fluid passing through the port 188 flows along the reduced portion 189 of the bobbin 172 and enters an annular port 191 which is connected with a discharge conduit 192 leading back to the reservoir 151. Fluid which is released from the actuated cylinder is not returned to the pump 157 directly, but rather is returned to the reservoir 151. The discharge line 192 has therefore very low frictional characteristics, so that discharge of fluid from an actuated cylinder, takes place very rapidly.

A displacement of the bobbin 172 in an opposite direction from the neutral position is illustrated in Fig. 9 wherein the land 174, instead of being moved below the port 187, is moved to a position above that port. In this position, working fluid entering through the port 168 and passing around the bobbin to enter the internal passage 178 through the opening 177 is prevented from escaping from such passage since the opening 181 is in registry with the interior cylindrical surface of the bore 171. However, there is communication between the inlet port 168 and the port 188 which is uncovered by the land 176, so that pressure fluid is introduced into one end of the connected actuated cylinder through the port 188. Discharge from the other end of the actuating cylinder is into the port 187 and thence around a reduced portion 193 of the valve bobbin to the discharge pipe 192 and back to the reservoir 151.

By suitably displacing the valve bobbin 172 in either direction from neutral position, the operator can control the flow of hydraulic fluid in such a manner as to cause a corresponding displacement of the piston within the connected hydraulic actuating chamber and thus produce an appropriate movement of the connected instrumentality of the earth mover. There is a continuous flow through the valve unit when the valve bobbin is in neutral position, in order to maintain the lines free of air and in quick-operating condition, and likewise there is provided an arrangement in which the discharge of fluid is relatively free and easy to promote quick operation.

Preferably, the arrangement of the ports is such that when all of the valve bobbins are in neutral position the high-pressure working fluid flowing through the conduit 158 and entering into the passage 168 of the first valve bobbin, as seen in Fig. 10, passes through the hollow center of such bobbin, discharging from the opening 184 and instead of going directly back to the reservoir 151, rather flows through a transfer passage 194 to enter the port 168 of the next valve. The oil flows through the hollow center of such valve and discharges from its corresponding port 184 through another transfer passage 196 to the port 168 on the third valve, flowing then through its hollow center and leaving the third valve port 184 and passing through the return line 186 to the pump 157. As soon, however, as one of the bobbins is displaced, this serial circulatory flow is interrupted and the operation of each individual valve is as described in connection with Figs. 7, 8 and 9.

While this general arrangement is readily applicable to the operation of any number of cylinders to be actuated, in its present installation there are three major instrumentalities to be moved, one of which is provided with a pair of cylinders, hence three valves are utilized, grouped in a unit.

The controlling instrumentality for the valve unit includes a casing 198 mounted on a suitable part of the tractor 6 adjacent to and preferably forward of the operator's station 9. The cable 199 extends from a suitable anchorage on the casing 198 to a suitable anchorage on the valve casing 169 which latter is preferably disposed on the forward portion 14 of the main frame of the drawn vehicle. The flexible cable 199 thus forms a support and mounting for a plurality of flexible control shafts, collectively designated 201, each of which extends from an appropriate connection in the housing 198 to a gear with which meshes a larger gear operated by a handle 202.

This general subject-matter is disclosed in my Patent 2,204,033.

The flexible shafts 201 are held to the cable 199 by appropriate supporting clips 203, and each of them terminates in a fitting 204 fastened to the housing 169. Similarly, the flexible hydraulic conduits 158 and 186 can likewise be suspended on the cable 199.

Since the three controlling valves are all alike, a description of one will suffice. Any number of valves can be provided, depending upon the number of instrumentalities to be controlled. The flexible shaft 201 (Fig. 3) extends to a rotatable screw 206 which revolves within an anti-friction bearing 207, held in place against axial movement in the housing 169 by the fitting 204. The fitting 204 can be removed for removal of the screw and disconnection of the shaft 201 therefrom. The threaded portion 208 of the screw is in engagement with a hollow nut 209, one end of which is fastened by a pin 211 to a valve bobbin 172 as previously described. The hollow nut on its exterior surface is provided with a plurality of longitudinal splines 212 operating in mating splines 213 within the body 169 to preclude any rotation of the nut or valve bobbin but to permit free axial movement thereof. Thus, as the shaft 201 and the screw 208 are rotated, a corresponding axial translation is imparted to the valve bobbin.

The valve bobbin is urged toward its neutral or central position, and oil leakage is largely precluded, by a double-acting spring-pressed packing, generally designated 214, which includes a cup leather 216 in engagement with the interior bore of the housing 169 and urged against a thrust washer 217 abutting a light ledge 218 in the housing by a coil spring 219. The other end of the coil spring abuts a circumferentially flanged and pierced cup 221 which in one position is in abutment with the valve bobbin 172 and also with the end of the valve cylinder body 169. When the valve is in neutral position, the spring 219 urges the thrust washer 217 against an enlargement on the hollow nut 209 and against the shoulder 218. Likewise, it forces the cup 221 against the end of the body 169 and against the end of the bobbin 172. If the bobbin moves to the right in Fig. 3, for example, the spring 219 is compressed, while if the bobbin is moved to the left in Fig. 3 the thrust washer 217 is likewise moved to the left and compresses the spring 219. Thus the bobbin is yieldingly urged into its neutral or median position. At the same time the cup leather 216 is effective to seal against oil leakage, although whatever leakage does take place past the cup leather is useful in lubricating the screw 208. Passages 222 within the screw 206 permit an equalizing flow of oil and air.

Within the body 169 (Fig. 4) the working fluid pressure conduit 158 is connected to the inlet passage 168 which is a passage extending to all three of the valve cylinders located in the body 169, and terminates in a port entirely surrounding each of the valve cylinders 171. In the neutral position of the valve shown in Fig. 4, the fluid which flows into the port 168 surrounding the valve passes into the interior channel 178 through ports 177, discharges therefrom through ports 181 into the annular port 184 which is in communication with and substantially surrounds its respective one of the valve bodies, and in turn merges with the inlet port 168 of the next valve and so on, finally communicating with the duct 186 through which the fluid returns to the inlet of the pump. When the valve bobbin is displaced to the left, for example, from the position shown in Fig. 4, so that the port 187 leading to one end of the cylinder mechanism is uncovered, then the return flow from such cylinder courses over the end of the bobbin and out through the pierced cup 221 into a central chamber 226 which communicates with all three of the valve mechanisms and likewise communicates with a central passage 227 extending through the casing 169.

At its opposite end the passage 227 opens into a chamber 228 formed by a closure cap 229 seated upon the casing and likewise communicating with the otherwise open end of each of the three valve bobbin bores, to return any leakage and to equalize the pressure on the bobbin ends. The central passage 227 communicates with the port 191 of each of the three valve cylinders, so that they all finally lead to the conduit 192 extending back to the fluid reservoir. Thus, when the bobbin is displaced to the left in Fig. 4, flow is from one of the hydraulic chambers through the port 187, around through the pierced cup 221, thence through the chamber 226 into the central passage 227, from which flow takes place through and around the port 191 into the conduit 192. During this time the pressure fluid from the conduit 158 and the port 168 is flowing around the reduced portion 173 of the bobbin and thence flows into the port 188 (Fig. 8) and into a suitable conduit to the other end of the respective hydraulic chamber.

As disclosed diagrammatically in Fig. 10, for example, the left-hand valve 174 is connected by a conduit 231 extending from the port 187 to one end of the hydraulic chamber 22, while a conduit 232 extends from the other end of the chamber 42 to the port 188. Comparably, a conduit 233 extends from the port 187 of the middle valve 174 to one end of each of the pair of chambers 32, while the branch conduit 234 extends from the other end of each of said pair of chambers 32 to the port 188 of the middle valve 174. In the same fashion, the conduit 236 extends from the port 187 of the right-hand valve 174 of Fig. 10 to one end of the chamber 42, while a conduit 237 extends from the other end of such chamber 42 to the port 188 of the right-hand valve 174.

The hydraulic arrangement is therefore such that it is remotely controlled by the operator of the tractor 6 in such a fashion that each valve is suitably actuated by the operator to provide a corresponding movement of the hydraulic chamber which actuates the earth-moving mechanism and so that the high-pressure working fluid is maintained relatively free of air or gas and in rapid circulation to produce the desired quick actuation of the moved unit. The various valves operate in series and are normally spring urged into a central position within which free fluid flow takes place. However, actuation of any one of the valves diverts the full fluid flow to the corresponding hydraulically expansible chamber to provide a positive and quick operation of the controlled instrumentality.

I claim:

1. An earth mover comprising a draft vehicle, a drum vehicle, hydraulically actuated mechanisms on said drawn vehicle, means for supplying hydraulic fluid to said mechanisms, means on said drawn vehicle for controlling said hydraulic fluid including a translatable valve bobbin, a rotatable controller on said draft vehicle, and means adapted to rotate faster than said controller for translating said bobbin in accordance with the rotation of said controller.

2. An earth mover comprising a draft vehicle having an engine thereon, a drawn vehicle having an earth moving instrumentality thereon, hydraulic means for actuating said instrumentality, means on said drawn vehicle for storing hydraulic fluid under pressure, means on said draft vehicle driven by said engine for supplying hydraulic fluid under pressure to said storing means, means including a translatable valve bobbin on said drawn vehicle for controlling flow of hydraulic fluid between said storing means and said actuating-means, a controller on said draft vehicle, and flexible means adapted to rotate faster than said controller for translating said bobbin in accordance with movement of said controller.

3. An earth mover comprising a drawn vehicle, a plurality of hydraulic actuators thereon, a valve body on said drawn vehicle, translatable valves in said body for controlling said actuators, a draft vehicle, means on said draft vehicle for supplying said valve body with hydraulic fluid, rotatable means on said draft vehicle for operating said valves, and rotatable, flexible means extending between said draft vehicle and said drawn vehicle and adapted to rotate faster than said rotatable means for transmitting the motion of said operating means to said valves.

4. An earth mover comprising a drawn vehicle, a plurality of hydraulic actuators thereon, a valve body on said drawn vehicle, valves in said body adapted to be moved to control said actuators, a draft vehicle, means on said draft vehicle for operating said valves, flexible means extending between said draft vehicle and said drawn vehicle for transmitting the motion of said operating means to said valves, and gearing for multiplying the motion of said transmitting means with respect to said operating means and with respect to said valves.

5. An earth mover comprising a vehicle having a main bowl, a pusher and a front apron, a hydraulic actuator for advancing and retracting the pusher, a second hydraulic actuator for raising and lowering the front apron, a third hydraulic actuator for raising and lowering the main bowl, a plurality of translatable valves on said vehicle one for each of said actuators, means for normally urging said valves into central position, and means for supplying hydraulic fluid to said valves in series whereby translation of one of said valves out of central position blocks hydraulic flow to actuators controlled by successive valves.

6. An earth mover comprising a vehicle having a main bowl, a pusher, and a front apron, a hydraulic actuator for advancing and retracting said pusher, a second hydraulic actuator for raising and lowering the front apron, a third hydraulic actuator for raising and lowering the main bowl, valves on said vehicle one for each actuator, springs for urging said valves into central position, a hydraulic circuit, means for connecting said valves in said circuit for hydraulic flow through said valves in series when said valves are in central position, and means incorporated in each of said valves for blocking flow to subsequent valves when said valve is out of central position.

ELLSWORTH W. AUSTIN.